US008838387B2

(12) United States Patent  
Larmo et al.

(10) Patent No.: US 8,838,387 B2  
(45) Date of Patent: Sep. 16, 2014

(54) HAPTIC FEEDBACK ENABLED NAVIGATION SYSTEM USING SHORT RANGE RADIO TECHNOLOGIES

(71) Applicant: Telefonaktiebolaget L M Ericsson (publ), Stockholm (SE)

(72) Inventors: Anna Larmo, Espoo (FI); Ari Keranen, Kirkkonummi (FI); Daoyuan Li, Espoo (FI); Rikka Susitaival, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 9 days.

(21) Appl. No.: 13/683,222

(22) Filed: Nov. 21, 2012

(65) Prior Publication Data

US 2014/0142851 A1    May 22, 2014

(30) Foreign Application Priority Data

Nov. 16, 2012    (WO) ................ PCT/EP2012/072831

(51) Int. Cl.
    *G01C 21/00*      (2006.01)
    *G06F 3/01*      (2006.01)

(52) U.S. Cl.
    CPC .............. *G01C 21/00* (2013.01); *G06T 2200/24* (2013.01); *G06F 2203/014* (2013.01); *G06F 3/016* (2013.01)
    USPC .............................. 701/538; 701/36; 701/431

(58) Field of Classification Search
    CPC .............. G06F 3/016; G06F 2203/014; G06T 2200/24; G01C 21/00
    USPC ........... 701/400, 36, 532, 538, 409, 408, 412, 701/431
See application file for complete search history.

(56) References Cited

U.S. PATENT DOCUMENTS

2010/0198458 A1*   8/2010   Buttolo et al. .................. 701/36
2010/0280713 A1*   11/2010   Stahlin et al. .................. 701/41

FOREIGN PATENT DOCUMENTS

| EP | 0886123 A2 | 12/1998 |
| EP | 2463628 A2 | 6/2012 |
| WO | 2007105937 A1 | 9/2007 |
| WO | 2008061539 A1 | 5/2008 |

OTHER PUBLICATIONS

International Search Report and Written Opinion issued on Aug. 28, 2013 in International Application No. PCT/EP2012/072831, 11 pages.

* cited by examiner

*Primary Examiner* — Gertrude Arthur Jeanglaude

(74) *Attorney, Agent, or Firm* — Rothwell, Figg, Ernst & Manbeck, P.C.

(57) ABSTRACT

The invention relates to a haptic navigation system, configured for providing a haptic instruction to a user, and to a method for providing a haptic instruction to a user. The haptic navigation system comprises a navigation module comprising a route calculation unit, configured for calculating at least one route for the user to go to a predetermined destination, and a user interaction unit, configured for capturing at least one input parameter from the user, and a feedback unit configured for receiving an instruction sent from the navigation module and for converting the instruction received into a haptic instruction such that the user find the correct route. In this way, a haptic navigation system is provided which is reliable, cost-effective to realize and can easily be integrated into existing navigation systems while at the same time making it possible to get rid of displays or voice recognition in navigation applications.

7 Claims, 1 Drawing Sheet

HAPTIC FEEDBACK ENABLED NAVIGATION SYSTEM USING SHORT RANGE RADIO TECHNOLOGIES

This application claims priority to international patent application no. PCT/EP2012/072831, filed 16 Nov. 2012, which is incorporated by reference herein in its entirety.

TECHNICAL FIELD

The invention relates to a haptic navigation system, configured for providing a haptic instruction to a user.

BACKGROUND

Currently, navigation systems are composed of two basic units. The first unit is the so-called route calculation unit and the second unit is the so-called user interaction unit. The route calculation unit is responsible for finding out paths or tracks based on input captured from a user via the user interaction unit. The user interaction unit is also responsible for presenting the calculated paths to the user and assisting the user to find a correct route and to stay on the right track.

A majority of the navigation systems existing on the market utilizes two different methods to remind a user of the right route or track. This is done via visual feedback where routes are displayed on a screen or via voice commands where users follow the synthesized speech broadcast from the navigation system. There are several problems associated to these existing methods. Firstly, the visual feedback method can be distractive or not feasible, for instance for cyclists. Secondly, the audio feedback method may be misleading in noisy environments or when using the navigation systems in a language other than the user's mother tongue. Thirdly, it requires extra costs for the manufacturers to support different languages.

SUMMARY

It is the object of the invention to provide a possibility for navigating a user without the need of any display or voice feedback while being reliable, cost-effective to produce and easy to be integrated into existing devices.

This object is achieved by the subject matter of the independent claims. Preferred embodiments are defined in the sub claims.

According to a first aspect of the invention, this object is achieved by a haptic navigation system, configured for providing a haptic instruction to a user, comprising a navigation module comprising a route calculation unit, configured for calculating at least one route for the user to go to a predetermined destination, and a user interaction unit, configured for capturing at least one input parameter from the user, and a feedback unit configured for receiving an instruction sent from the navigation module and for converting the instruction received into a haptic instruction such that the user finds the correct route.

It is an idea of the invention to use a typical navigation module in combination with a feedback unit, such as a wristband or a glove, which receives navigation instructions from the navigation module. The instruction received is preferably converted into a haptic instruction that is adapted for directing the user to the correct path, track, route or direction. The inventive idea is applicable to a bike, to a car, to motorcycling and skiing or similar vehicles, devices, or ways of moving around. The inventive idea is even applicable to such simple action as running. Preferably, the navigation module comprises a sender and a receiver and there is preferably also a sender and a receiver in the feedback unit. Preferably, the receiver is arranged in the feedback unit and the transceiver is preferably arranged in the navigation module. Advantageously, distances between the navigation module and the feedback unit of about several meters are achievable, preferably a distance of up to 10 or 15 meters.

According to a preferred embodiment of the invention, the haptic instruction comprises a vibration signal that is sent in a direction towards the user such that the user is directed to the correct route. The vibration signal is preferably configured for vibrating with a predetermined magnitude and/or in a predetermined pattern. The magnitude is preferably preset and/or the pattern is preset and can be chosen by the producers or even by the user to empiric values or according to their requirements, i.e. their needs. According to other preferred embodiments, instead of a vibration signal any other kind of signal is used.

According to a preferred embodiment of the invention, the feedback unit is configured for sending the haptic instruction to clothes, such as gloves, a hat, a pullover, a scarf and/or a shoe, wearable at at least one part of the body of the user, such as at a hand, head, stomach, neck and/or a foot. The haptic navigation system preferably further comprises a signalling unit configured for displaying a direction and/or a turn to the user, such as displaying an arrow indicating the direction to the user. The haptic navigation system preferably further comprises a sound generator configured for broadcasting a voice signal configured for instructing the user to select a correct direction to go to the predetermined destination. Hence, the additional use of classical methods, such as displaying or broadcasting of voice signals, serves for supporting the user to find or to stay on the right track. Preferably, the feedback unit is integrated into a wristband, a neckband, a bandage, a steering wheel of a car, into a part of a motorcycle, into a part of a bicycle, into a part of a ski, into clothes, such as gloves, into a hat, into a pullover, into a scarf and/or into a shoe.

According to a second aspect of the invention, above mentioned object is achieved by a method for providing a haptic instruction to a user comprising the steps of: a) capturing at least one input parameter from the user, b) calculating at least one route for the user based on the at least one input parameter captured to go to a predetermined destination and sending the at least one route calculated as an instruction, and c) converting the instruction received into a haptic instruction such that the user finds the correct route.

It is thus an idea of the invention to improve the user experience of existing navigation modules. Furthermore, it is secure and reliable to use the inventive idea at hand.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
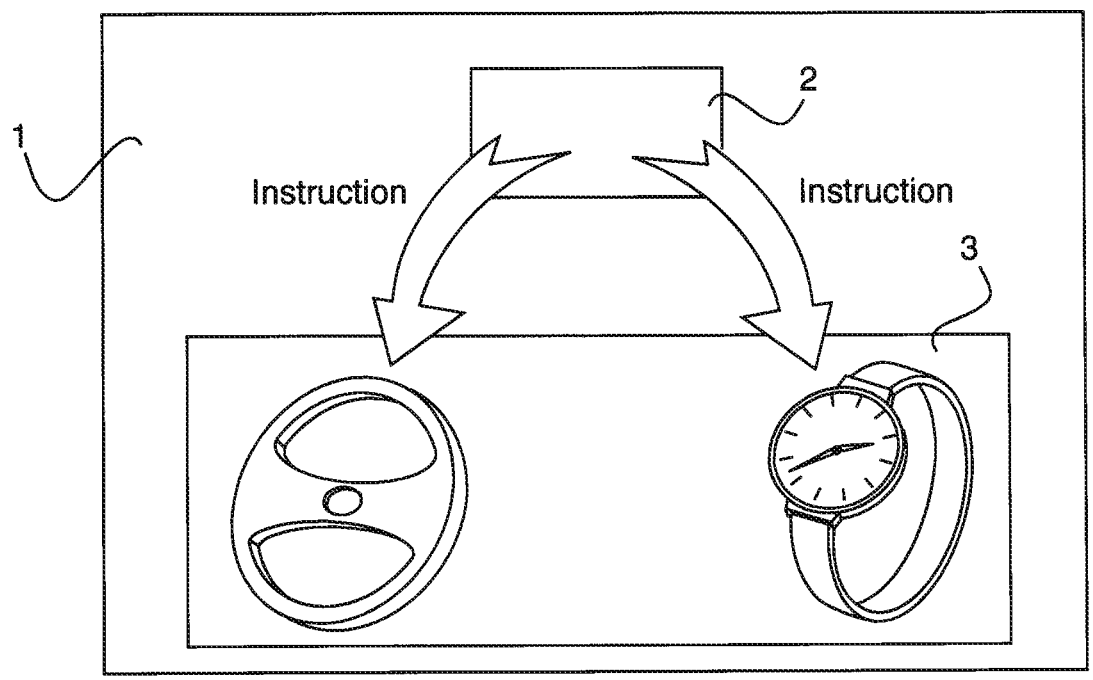
FIG. 1 shows a haptic navigation system configured for providing a haptic instruction to a user according to a first preferred embodiment of the invention.

FIG. 1 shows a haptic navigation system 1 configured for providing a haptic instruction to a user according to a first preferred embodiment of the invention. The system 1 comprises a classical navigation module 2. The navigation module 2 includes two parts, wherein the first part comprises a route calculation unit and the second part comprises a user interaction unit. The route calculation unit calculates one route for the user to go to a predetermined destination that is chosen by the user. The user interaction unit captures one input parameter, the street name or postal address in this first preferred embodiment, from the user. The navigation module 2 thus sends an instruction to a haptic feedback unit 3 which then receives this instruction and converts it into a haptic instruction such that the user finds the correct route. According to this first preferred embodiment of the invention, the haptic instruction corresponds to a vibration signal that is sent in a direction towards the user such that the user can feel the vibration and recognize if he or she is on the right route. The vibration comprises a predetermined magnitude and a predetermined pattern. According to this first preferred embodiment of the invention, the feedback unit 3 is integrated into a wristband and additionally into a steering wheel of a car. According to other preferred embodiments of the invention, the feedback unit 3 is integrated into a part of a motorcycle, into a part of a ski, a shoe, a helmet or into a part of a bicycle.

In this first preferred embodiment a short range radio is used to help a user to stay on track, i.e. to find the right route to the predetermined destination. The haptic navigation system comprises a signalling unit which signals a turn to the user via the haptic signal. Additionally, the turn is displayed as an arrow on a display confirming the direction, i.e. the turn, to the user. Preferably, Bluetooth or ZigBee is used. The feedback unit in turn vibrates in certain magnitudes or patterns which are used to signal the sharpness of the turn and also serves as a warning signal in this first preferred embodiment.

According to other preferred embodiments of the invention, an integration of the haptic navigation system into turning signal lights is possible and beneficial. Many cyclists use gestures to signal their direction of turning. This might be dangerous and cause fatal accidents. When turning signal lights are also connected to the haptic navigation system which comprises the feedback unit via a short range radio, it becomes possible to signal turning safely by relaying signals further to the turning signal lights. Hence, the risk of traffic accidents is reduced. According to yet other preferred embodiments of the invention, a mobile phone comprises navigation software that serves to signal the user the correct route and a wristband serves for haptic feedback to the user.

Figure 2:
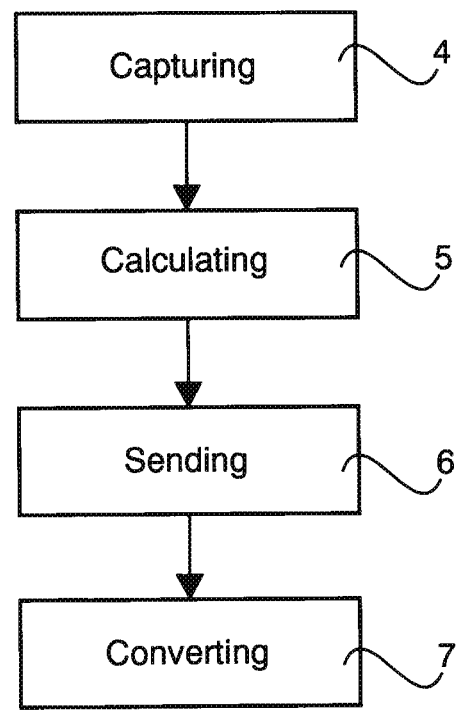
FIG. 2 schematically illustrates the steps of a method for providing a haptic instruction to a user according to a second preferred embodiment of the invention.

FIG. 2 schematically illustrates the steps of a method for providing a haptic instruction to a user according to a second preferred embodiment of the invention. In a first step, one input parameter from the user is captured 4. In a second step, one route for the user based on the input parameter captured is calculated 5 to go to a predetermined destination. Thereafter, the route calculated is sent 6 as an instruction. Finally, the instruction received is converted 7 into a haptic instruction such that the user finds the correct route.

While the invention has been illustrated and described in detail in the drawings and foregoing description, such illustration and description are to be considered illustrative or exemplarily and not restrictive; the invention is not limited to the disclosed embodiments.

Other variations to the disclosed embodiments can be understood and affected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that the combination of these measures cannot be used to advantage. Any reference signs in the claims should not be construed as limiting the scope.

The invention claimed is:

1. A haptic navigation system, configured for providing a haptic instruction to a user, comprising:
   a navigation module comprising a route calculation unit, configured for calculating at least one route for the user to go to a predetermined destination, and a user interaction unit, configured for capturing at least one input parameter from the user, and
   a feedback unit configured for receiving an instruction sent from the navigation module and for converting the instruction received into a haptic instruction such that the user finds the correct route, wherein the feedback unit is at least one of:
   integrated into a wristband, a neckband, a bandage, a steering wheel of a car, into a part of a motorcycle, into a part of a bicycle, into a part of a ski, into clothes, such as gloves, into a hat, a helmet, into a pullover, into a scarf and/or into a shoe; and,
   configured for sending the haptic instruction to clothes, such as gloves, a hat, a helmet, a pullover, a scarf and/or a shoe, wearable on at least one part of the body of the user, such as at a hand, head, stomach, neck and/or a foot.

2. The haptic navigation system according to claim 1, wherein the haptic instruction comprises a vibration signal that is sent in a direction towards the user such that the user is directed to the correct route.

3. The haptic navigation system according to claim 2, wherein the vibration signal is configured for vibrating with a predetermined magnitude and/or in a predetermined pattern.

4. The haptic navigation system according to claim 1, further comprising a signalling unit configured for displaying a direction and/or a turn to the user, such as displaying an arrow indicating the direction to the user.

5. The haptic navigation system according to claim 1, further comprising a sound generator configured for broadcasting a voice signal configured for instructing the user to select a correct direction to go to the predetermined destination.

6. A method for providing a haptic instruction to a user, comprising the steps of:
   a) capturing at least one input parameter from the user,
   b) calculating at least one route for the user based on the at least one input parameter captured to go to a predetermined destination and sending the at least one route calculated as an instruction,
   c) converting the instruction received into a haptic instruction such that the user finds the correct route, and
   d) transmitting the haptic instruction to the user to one or more of:
   a wristband, a neckband, a bandage, a steering wheel of a car, into a part of a motorcycle, into a part of a bicycle, into a part of a ski, into clothes, such as gloves, a hat, a helmet, into a pullover, into a scarf and/or a shoe;
   clothes, such as gloves, a hat, a helmet, a pullover, a scarf and/or a shoe, wearable on at least one part of the body of the user, such as at a hand, head stomach, neck and/or a foot.

7. A haptic navigation system, comprising:
   a route calculation unit configured for calculating a route for a user; and
   a feedback unit configured for receiving an instruction and for converting the instruction received into a haptic instruction that directs the user along the route, wherein the feedback unit is at least one of:

integrated into a wristband, a neckband, a bandage, a steering wheel of a car, into a part of a motorcycle, into a part of a bicycle, into a part of a ski, into clothes, such as gloves, into a hat, a helmet, into a pullover, into a scarf and/or into a shoe; and, configured for sending the haptic instruction to clothes, such as gloves, a hat, a helmet, a pullover, a scarf and/or a shoe, wearable on at least one part of the body of the user, such as at a hand, head, stomach, neck and/or a foot.

\* \* \* \* \*

UNITED STATES PATENT AND TRADEMARK OFFICE
CERTIFICATE OF CORRECTION

PATENT NO. : 8,838,387 B2
APPLICATION NO. : 13/683222
DATED : September 16, 2014
INVENTOR(S) : Larmo et al.

It is certified that error appears in the above-identified patent and that said Letters Patent is hereby corrected as shown below:

On the Title Page, in item (72), under "Inventors", in Column 1, Line 1, delete "Keranen," and insert -- Keränen, --, therefor.

On the Title Page, in item (72), under "Inventors", in Column 1, Line 3, delete "Rikka" and insert -- Riikka, --, therefor.

Signed and Sealed this
Twelfth Day of May, 2015

Michelle K. Lee
*Director of the United States Patent and Trademark Office*